United States Patent Office 2,943,980
Patented July 5, 1960

2,943,980

THIADIAZOLES

Giulio Maffii, Renato Ettorre, and Emilo Testa, Milan, Italy, assignors to Lepetit S.p.A., Milan, Italy No Drawing. Filed Apr. 30, 1957, Ser. No. 655,962

Claims priority, application Italy May 5, 1956

11 Claims. (Cl. 167—65)

The present invention relates to new organic compounds having biological activity. More particularly, the invention is concerned with three new 5-substituted-2-amino-1,3,4-thiadiazoles, and to a process for preparing them.

The compounds with which the invention is concerned may be represented by the following formula:

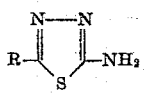

wherein R represents a member of the class consisting of 2-thienyl, o-chlorophenyl and o-tolyl. These new compounds have effective central depressant properties in man. Moreover, they possess marked anti-convulsant properties in experimental animals, for example in rats and mice. They are able to prevent the occurrence of electroshock seizures and strychnine induced convulsions. In this respect, they have proved decidedly superior to known drugs. Other advantages of the new compounds will be apparent from the following description.

To test the pharmacological properties of the compounds of the invention, the current strength was determined which, when administered through auricular electrodes, produced a typical electro-convulsive seizure on all experimental animals. A current strength of about 12 milliamperes applied for 0.2 second was the minimum effective dose. The tests were carried out with a fourfold current strength, i.e. about 50 milliamperes. The compounds were administered to mice and rats at graded dose levels by intraperitoneal route after being suspended in water containing 5% gum arabic. The dose protecting 50% of the animals from electroshock seizures ($PD_{50}$) was determined by the customary methods. Table I gives the mean protective doses and the duration of the protection of the compounds of the invention and of meprobamate (2-methyl-2-n-propyl-1,3-propanediol dicarbamate), which at present is one of the most effective and widely used anticonvulsants.

Table I

| Compound | Animal | $PD_{50}$ (mg./kg.) | Duration of protection (hrs.) |
|---|---|---|---|
| -2-amino-5-(2-thienyl)-1,3,4-thiadiazole | mouse | 70 | 3 |
| | rat | 18 | 6 |
| -2-amino-5-(o-chlorophenyl)-1,3,4-thiadiazole | mouse | <50 | 3 |
| | rat | 75 | 4 |
| -2-amino-5-(o-tolyl)-1,3,4-thiadiazole | mouse | 75 | 3 |
| | rat | 15 | 2 |
| -meprobamate | mouse | 85 | 2 |
| | rat | 50 | 4 |

In testing the prevention of strychnine induced convulsions, mice were injected intraperitoneally with 2-amino-5-thienyl-1,3,4-thiadiazole suspended in water containing 5% gum arabic. After 20 minutes, 2.5 mg. of strychnine nitrate, i.e. a purely lethal dose, was injected peritoneally and the animals were observed for 4 days. A corresponding test was carried out with meprobamate. The results are summarized in Table II, wherein the doses protecting 50% of the animals from death and from strychnine induced convulsions ($PD_{50}$) are recorded.

Table II

| Compound | $PD_{50}$ in mg./kg. (death) | $PD_{50}$ in mg./kg. (convulsions) |
|---|---|---|
| -2-amino-5-(2-thienyl)-1,3,4-thiadiazole | 80 | 100 |
| -2-amino-5-(o-chlorophenyl)-1,3,4-thiadiazole | <100 | 100 |
| -2-amino-5-(o-tolyl)-1,3,4-thiadiazole | 100 | >100 |
| -meprobamate | 200 | >500 |

The compounds of the invention are also exceptionally active in paralyzing voluntary muscles. The paralyzing activity, which was tested on mice, rats, cats, rabbits and dogs, manifests itself in a complete inability to move. However, the paralysis is not accompanied by any change in vital functions, such as respiration and heart action, and is reversible. All the animals recover from paralysis without undesirable side effects.

As shown by pharmacological studies, paralysis is induced by a depressant effect on the central nervous system. The products do not show any curare-like action. The 50% paralyzing doses and the approximate duration of paralysis of the compounds in comparison with meprobamate is recorded in Table III. The compounds are active by oral route.

Table III

| Compound | Animal | 50% paralyzing dose (mg./kg.) | Approximate paralysis duration (hrs.) |
|---|---|---|---|
| -2-amino-5-(2-thienyl)-1,3,4-thiadiazole | mouse | 140 | 1½ |
| | rat | 96 | 2 |
| -2-amino-5-(o-chlorphenyl)-1,3,4-thiadiazole | mouse | 75 | 2 |
| | rat | 150 | 3 |
| -2-amino-5-(o-tolyl)-1,3,4-thiadiazole | mouse | 110 | 4 |
| | rat | <100 | 4 |
| -meprobamate | mouse | 200 | 2 |
| | rat | 200 | 2 |

The compounds of the invention are also very effective as sedatives. This activity is noted also when they are associated with barbiturics. In fact, they markedly potentiate the hypnotic activity of barbiturics. The following experiments were carried out to determine this potentiating activity.

Mice were injected intraperitoneally with doses of 15 mg./kg. of the compounds suspended in water containing 5% gum arabic. After 20 minutes, 40 mg./kg. of pentobarbitone sodium were also injected intraperitoneally. The increase in sleep duration averaged about 200% in comparison with controls treated with the barbituric alone.

Rats were injected intraperitoneally with doses of 15 mg./kg. of the compounds suspended as above. After 10 minutes, 45 mg./kg. of thiopentone sodium were also injected intraperitoneally. None of the animals treated with barbiturate alone became subject to a complete sleep, but 40% of the animals previously injected with the new compounds slept for about 20 minutes.

The compounds of the invention do not show noticeable hypotensive or ganglioplegic action. Moreover, they have no influence on the cardiovascular reflexes due to stimulation of the carotid sinus.

No action on smooth and striated muscles has been observed. The compounds of the invention were also tested by oral route in human beings and found effective against the disturbances due to anxiety conditions. It has been ascertained that this effect is of primary nature, since it is not accompanied by modifications of the muscular tension, medullar polysynaptic reflexes and neurovegetative system.

The experiments have shown that the compounds may be safely administered in daily doses ranging from 200 to 1000 mg. and more without causing toxic effects. The individual requirement varies broadly according to the severity of the disease. In some instances, 25 mg. tablets were administered 3–9 times a day, and this dosage was maintained for several days until a durable effect was obtained. In other cases 100 mg. tablets were used 3–6 times a day. The therapy with the compounds of the invention was carried out mostly in the following syndromes: anxiety psychoneurosis, depressive neurasthenic psychoneurosis, hypochondrial phobic and obsessive psychoneurosis, paranoic and hysteric psychoneurosis,, paranoid schizophrenia, severe epilepsy. In any case, considerable advantages were obtained in removing anxiety, insomnia, and restlessness.

The preparation of the tablets for human therapy is carried out with well known methods, by thoroughly admixing the compounds of the invention with diluents, lubricants, melting agents, flavoring, sweetening agents etc. and tableting the mixtures. The examples contain typical embodiments of the invention as far as the preparation of tablets is concerned.

In this respect it is to be observed that the substances of the invention, which are basic in character, may be used as such or in form of their inorganic acid salts, such as the hydrochloride, sulfate, etc. Of course in this case the doses are to be adjusted, i.e., increased to such a degree that the desired amount of the free base is administered. For instance, when 2-amino-5-(2-thienyl)-1,3,4-thiadiazole hydrochloride is used instead of the base, the doses must be increased by about 20%. It is intended that this apply to all the examples wherein directions for the preparation of pharmaceutical composition are given.

The new compounds of the invention can be prepared in two ways. The one starts from carboxylic acid chlorides of the formula R—COCl wherein R has the significance of 2-thienyl, or o-chlorophenyl, or o-tolyl, which are reacted with thiosemicarbazide in a solvent, for example acetic acid or pyridine, in which the acid chloride is soluble. The so obtained $N^1$-acyl-thiosemicarbazides of the formula

R—CONHNHCSNH$_2$ are treated with about two volumes of concentrated sulfuric acid for some minutes. The mixture is poured into water and filtered from any insoluble substance, if necessary. The thiadiazole is then precipitated by adding to the solution ammonia to pH about 8.

Alternatively, an aldehyde of the formula

wherein R has the above significance, is transformed into its thiosemicarbazone, according to known processes. The obtained thiosemicarbazone of the formula

R—CH=NNHCSNH$_2$ is suspended in water and heated to 80° C. with about 3 parts of ferric chloride for 15–60 minutes. The solution is evaporated in vacuo to dryness and the obtained thiadiazole is recrystallized from dilute hydrochloric acid as the hydrochloride. The free thiadiazole may be obtained by addition of alkalies to the hydrochloride.

The free thiadiazoles, in turn, may be transformed into their mineral acid addition salts by reaction with an equivalent amount of a mineral acid, such as sulfuric, nitric, phosphoric, hydrochloric, hydrobromic, hydroiodic acid and so on. Although both methods give the expected compounds, we have found that the latter gives the better results with regard to yield, purity, etc.

The following examples are illustrative of the invention.

*Example No. 1*

Into a solution, previously heated to reflux, of 120 g. of 2-thienaldehyde in 400 ml. of 95% ethyl alcohol a solution of 100 g. of thiosemicarbazide in 300 ml. of 15% hydrochloric acid is quickly poured: white crystals precipitate at once. The mixture is refluxed for an additional 30 minutes and the crystals are collected in vacuo and washed with cold 50% ethyl alcohol. Yield 197 g. of 2-thienaldehyde thiosemicarbazone. The obtained thiosemicarbazone is mixed with 12 liters of water and 540 g. of ferric chloride and the mixture is heated at 80° C. for 30 minutes. A small insoluble crystalline portion is filtered out, the filtrate is decolorized with sodium hydrosulfite, evaporated in vacuo until crystals begin to separate and cooled in an ice bath. The crystals are collected in vacuo and recrystallized from 10% hydrochloric acid. M.P. 241–43° C. Yield 132 g. (56%) of 2-amino-5-(2-thienyl)-1,3,4-thiadiazole hydrochloride. Analysis of this compound gave for $C_6H_5N_3S_2 \cdot HCl$, M.W. 219.72, calcd., percent, N 19.13, S 29.19, Cl 16.13; found, percent N 18.96, S 29.08, Cl 15.89.

*Example No. 2*

A mixture of 25 g. of o-chlorobenzaldehyde thiosemicarbazone, 1250 ml. of water and 60 g. of ferric chloride is heated for 45 minutes at 80° C., a small amount of dissolved crystals is filtered away, the solution is decolorized with sodium hydrosulfite and evaporated in vacuo until crystals begin to separate. The mixture is cooled in an ice bath, then the product is collected in vacuo and recrystallized from 10% hydrochloric acid. M.P. 184–186° C. Yield 15.5 g. (53%) of 2-amino-5-(o-chlorophenyl)-1,3,4-thiadiazole hydrochloride. Analysis of this compound gave for $C_8H_6ClN_3S \cdot HCl$, M.W 248.14, calcd., percent N 16.93, S 12.92, Cl 28.58; found, percent, N 17.02, S 13.05, Cl 28.49.

*Example No. 3*

A mixture of 193 g. of o-tolualdehyde thiosemicarbazone, 15 liters of water and 500 g. of ferric chloride is heated about 20 minutes at 80° C. A small amount of undissolved crystals is filtered away, the solution is decolorized with sodium hydrosulfite and evaporated in vacuo until crystals begin to separate. After cooling in an ice bath, the product is collected in vacuo and recrystallized from 10% hydrochloric acid. Yield 125 g. (55%) of 2-amino-5-(o-tolyl)-1,3,4-thiadiazole hydrochloride. M.P. 128–30°. Analysis of this compound gave for $C_9H_9N_3S \cdot HCl$, M.W. 227.71, calcd., percent, N 18.42, S 14.08, Cl 15.57; found, percent, N 18.35, S 13.92, Cl 15.66.

*Example No. 4*

| | Mg. |
|---|---|
| 2-amino-5-(2-thienyl)-1,3,4-thiadiazole | 25 |
| Cornstarch | 100 |
| Magnesium stearate | 3 |

The three powders are thoroughly mixed and tableted.

*Example No. 5*

| | Mg. |
|---|---|
| 2-amino-5-(o-chlorophenyl)-1,3,4-thiadiazole | 100 |
| Lactose | 100 |
| Talc | 10 |
| Magnesium stearate | 5 |

The powders are thoroughly mixed and tableted.

*Example No. 6*

| | Mg. |
|---|---|
| 2-amino-5-(o-tolyl)-1,3,4-thiadiazole | 100 |
| Lactose | 50 |
| Cornstarch | 20 |
| Magnesium stearate | 5 |
| Talc | 10 |
| Sugar coating | 100 |

The active ingredient, lactose and cornstarch are mixed and granulated. Magnesium stearate and talc are added and the mixture is tableted. The tablets are then coated with sugar.

We claim:

1. The 5-substituted 2-amino-1,3,4-thiadiazoles of the formula

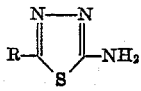

wherein R is a member of the class consisting of 2-thienyl, o-chlorophenyl and o-tolyl radicals, and their mineral acid addition salts.

2. 2 - amino - 5 - (2-thienyl)-1,3,4-thiadiazole hydrochloride.
3. 2-amino-5-(2-thienyl)-1,3,4-thiadiazole.
4. 2-amino-5-(o-chlorophenyl)-1,3,4-thiadiazole hydrochloride.
5. 2-amino-5-(o-tolyl)-1,3,4-thiadiazole hydrochloride.
6. 2-amino-5-(o-chlorophenyl)-1,3,4-thiadiazole.
7. 2-amino-5-(o-tolyl)-1,3,4-thiadiazole.

8. A tranquillizing composition in dosage unit form adapted for the treatment of anxiety conditions comprising a solid pharmaceutical carrier and from 0.1 to 100 milligrams per dosage unit of a medicament active on the central nervous system and selected from the group consisting of compounds of the formula

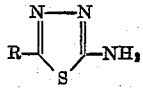

wherein R represents a member of the class consisting of 2-thienyl, o-chlorophenyl and o-tolyl, and pharmacologically acceptable acid addition salts thereof.

9. A tranquillizing composition as described in claim 8, wherein the medicament active on the central nervous system is 2-amino-5-(2-thienyl)-1,3,4,-thiadiazole.

10. A tranquillizing composition as described in claim 8, wherein the medicament active on the central nervous system is 2-amino-5-(o-chlorophenyl)-1,3,4-thiadiazole.

11. A tranquillizing composition as described in claim 8, wherein the medicament active on the central nervous system is 2-amino-5-(o-tolyl)-1,3,4-thiadiazole.

References Cited in the file of this patent

UNITED STATES PATENTS

| 2,422,050 | Steahly | June 10, 1947 |
| 2,702,803 | Ainsworth | Feb. 22, 1955 |

OTHER REFERENCES

Shulman: Nature, April 14, 1956, page 703.